UNITED STATES PATENT OFFICE.

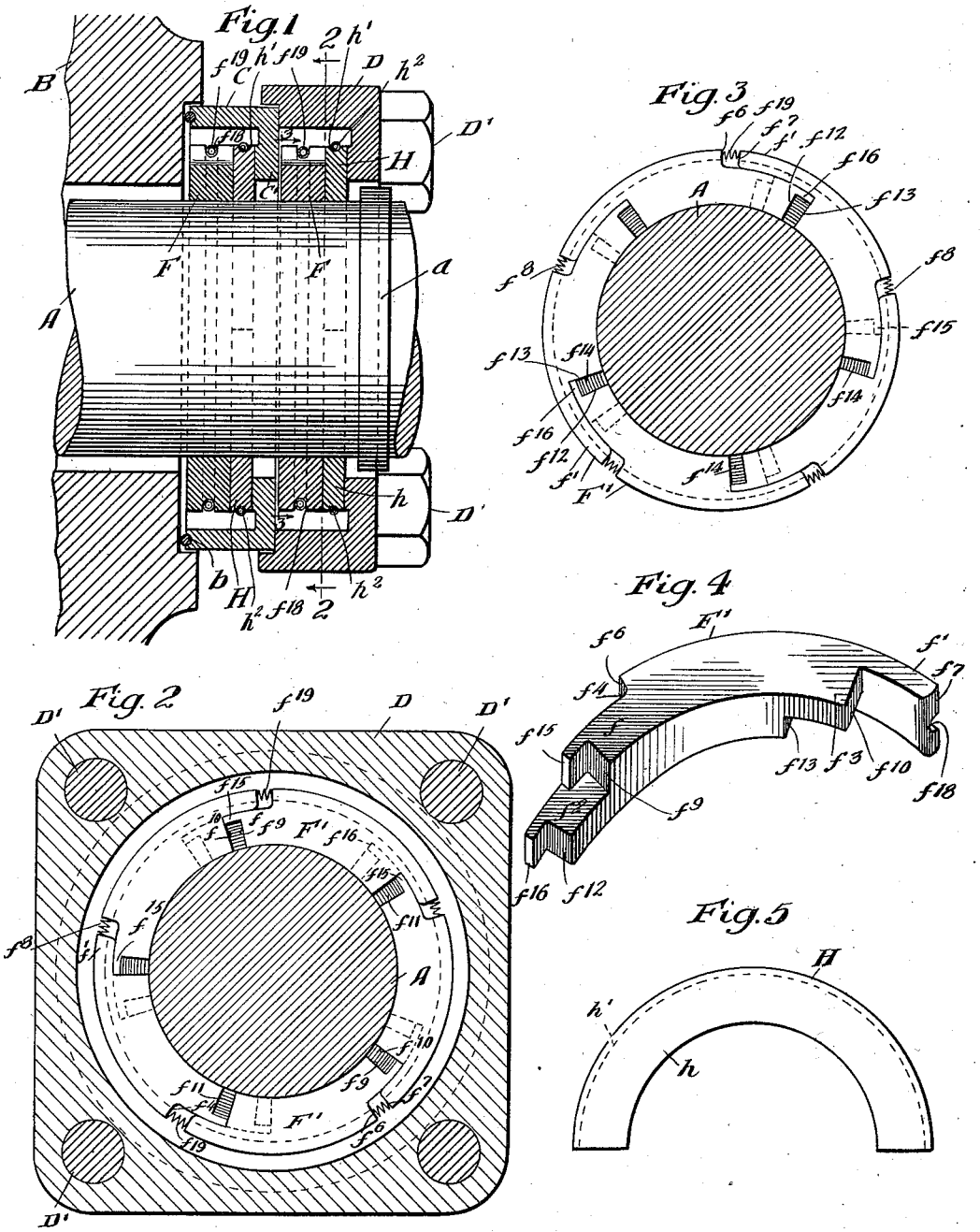

JOHN H. LEWIS AND LOUIS G. KUNZER, OF CHICAGO, ILLINOIS.

METALLIC PACKING FOR PISTON-RODS.

1,008,655.  Specification of Letters Patent.  Patented Nov. 14, 1911.

Application filed November 19, 1910. Serial No. 593,166.

*To all whom it may concern:*

Be it known that we, JOHN H. LEWIS and LOUIS G. KUNZER, citizens of the United States, residing at Chicago, in the county of Cook and State of Illinois, have invented a new and useful Improvement in Metallic Packing for Piston-Rods, of which the following is a specification.

Our invention relates to improvements in piston rod packings, and more particularly to improvements upon the metallic piston rod packing forming the subject of our Patents 721709 and 721710 of March 3, 1903, 807294 of Dec. 12, 1905, and 832068 of October 2, 1906.

The object of our present improvement is to increase the durability and efficiency, in practical operation, of our patented metallic piston rod packing. This we accomplish and herein our improvement consists, by providing each of the segments of our metallic packing ring with two thin, narrow compression fingers, one extending from the middle to one flat face of the ring or segment, and the other from the middle to the other flat face of the ring or segment, thus equalizing the resistance offered by these compression fingers on both faces of the packing ring, and also utilizing the entire thickness of the packing ring in making the joints between adjacent segments of the packing ring steam tight. This, we find in practical operation, very materially increases the life or durability of the packing ring, and also its efficiency in practical operation.

In the accompanying drawing forming a part of this specification, Figure 1 is a longitudinal, vertical section, showing a portion of a cylinder head and piston rod furnished with our improved metallic packing, and embodying our invention. Fig. 2 is a cross section on line 2—2, looking in the direction of the arrows. Fig. 3 is a cross section on line 3—3 of Fig. 1, looking in the opposite direction to Fig. 2. Fig. 4 is a detail perspective view of one of the segments of the packing ring, all the segments being alike. Fig. 5 is a detail plan view of one of the segments of a supplemental abutment ring, preferably employed in connection with the packing ring.

In the drawing, A represents a piston rod, B a portion of a locomotive cylinder head, C a packing head ring interposed between the cylinder head B and gland D, which is secured by bolts $D^1$ to the cylinder head, a wire or other packing $b$ being interposed between ring C and cylinder head B to insure a tight joint. The packing head ring C and gland D are preferably of right angle form in cross section and form chambers to receive the metallic packing rings F, which are preferably two in number and separated from each other by the flange portion $C^1$ of the packing head ring C. Each of the annular chambers formed by the gland D and packing head ring C preferably receives in addition to the segmental packing ring F a supplement or abutment segmental ring H.

Each of the metallic packing rings F comprises a plurality of segments $F^1$, preferably five in number, each of which is halved, notched or offset in two planes, one plane or surface of division being parallel to the circumference of the piston or packing ring, and the other plane or surface of division being at right angles to the piston and forming overlapping leaves or members, and three radially extending partial joints, each of which radial joints, however, extends only part way across or through the packing ring.

The segments $F^1$ of each of the metallic packing rings F are all exactly alike and each thus has at one end a radially inner leaf or member $f$, and at its opposite end a radially outer leaf or member $f^1$ which overlaps the inner leaf or member $f$ of the adjacent meeting segment. Each of the segments $F^1$ also has its inner leaf or member $f$ provided with a side leaf member $f^2$, and at its opposite end with a side leaf member $f^3$ which overlaps the corresponding side leaf member $f^2$ on the end of the adjacent or meeting segment. Each of the segments $F^1$ has a peripheral notch $f^4$ at one end to receive the overlapping outer leaf or member $f^1$ on the adjacent or abutting segment to receive the side leaf $f^2$ on the inner leaf $f$ of the adjacent or abutting segment. The shoulder $f^6$ of the notch $f^4$ and the end $f^7$ of the outer leaf $f^1$ of two adjacent segments thus form one partial radial joint $f^8$ through the packing ring, this joint extending through the whole thickness of the ring in the direction of the axis of the piston rod, but only partially through the ring radially. The adjacent shoulders $f^9$ of the inner leaf $f$ and $f^{10}$ of the side member $f^3$ thus form another partial radial joint $f^{11}$, this joint extending only half way through the thickness of the packing ring as a whole, and also only part way through the packing ring radially; and the adjacent shoulders $f^{12}$ and $f^{13}$ also form another partial radial joint $f^{14}$ which likewise extends only partially through the packing ring radially and only partially through the thickness of the packing ring. The several partial joints $f^8$, $f^{11}$ and $f^{14}$ also come at different points of the circumference and break joints with each other. The inner leaf or member $f$ of each segment $F^1$ is furnished with two thin, narrow compression fingers $f^{15}$ $f^{16}$, one upon its main portion and the other upon its side leaf portion $f^2$ so that these compression fingers $f^{15}$ $f^{16}$ will together extend through the entire thickness of the packing ring in the direction of the axis of the piston rod, and so that both faces of the packing ring segments $F^1$ will have a compression finger extending thereto from the middle portion of the segment, and so that the resistance to collapse of the packing ring as a whole to compensate for wear, etc. will be thus equalized on both faces of the packing ring.

The thin, narrow compression finger $f^{15}$ abuts at its extreme edge against the radial shoulder $f^{10}$ of the next adjacent segment, thus forming a tight joint therewith; and the compression finger $f^{16}$ on the side leaf portion $f^2$ of the inner leaf $f$ abuts at its extreme end or edge against the radial shoulder $f^{13}$, thus forming a tight joint therewith; the two compression fingers $f^{15}$ $f^{16}$ thus together forming a tight joint through the entire thickness of the packing ring. The thin narrow compression fingers $f^{15}$ $f^{16}$ at the same time permit, by their compression or upsetting, the segments to contract or come together as the inner periphery of the packing ring wears away by the reciprocation of the piston rod.

All the segments F are furnished with a peripherally extending groove $f^{18}$ to receive a coiled spring $f^{19}$, which surrounds the metallic packing ring as a whole and serves to hold the segments together.

As the openings in the gland D and packing head ring C are preferably made large enough to receive a piston rod A, having a collar $a$, supplemental or abutment segmental rings H are provided, one for each of the packing rings F, the ring H being made in two segments $h$, each furnished with a peripheral groove $h^1$ to receive a wire spring $h^2$ to hold the segments together.

By providing compression fingers upon the opposite sides of the packing, both sides of the latter are compressed or upset to the same extent, so that the packing retains its perfect shape, and no part of it exerts any undue friction on the piston rod, and it does not twist or roll upon itself. Our use of the invention has demonstrated that it lengthens the life of usefulness of the packing considerably more than one half beyond what has been attained with previous constructions.

We claim:—

1. A metallic packing comprising a plurality of interfitting segments having overlapping leaves or members at their meeting ends forming a plurality of partial radial joints, said segments being each provided with narrow compression members upon opposite sides, such members yielding or upsetting equally to permit contraction of the segments and compensation for wear, and acting to prevent twisting or rolling by the packing.

2. A metallic packing comprising a plurality of segments having interfitting and overlapping meeting ends, each segment having narrow compression fingers upon opposite sides, such fingers yielding or upsetting to permit the contraction of the segments, and rendering the yielding alike upon both faces of the packing.

3. A metallic packing comprising a plurality of segments having interfitting and overlapping meeting ends, each segment having narrow compression fingers upon opposite sides, and each also having shoulders against which the fingers of the adjacent segment abut, such fingers yielding or upsetting to permit the contraction of the segments and rendering the yielding alike upon both faces of the packing.

4. A metallic packing comprising a plurality of segments having interfitting and overlapping meeting ends, each segment having narrow compression fingers $f^{15}$ and $f^{16}$ upon opposite sides, and each also having shoulders $f^{10}$ and $f^{13}$ against which the fingers of the adjacent segment abut, such fingers yielding or upsetting to permit the contraction of the segments and rendering the yielding alike upon both faces of the packing.

5. In a metallic packing, a packing ring segment having at one end an inner leaf $f$ provided with a thin, narrow compression finger $f^{15}$ and also a side leaf member $f^2$ provided with a thin, narrow compression finger $f^{16}$, said segment having at its opposite end an outer leaf $f^1$ and side leaf $f^3$, said segment having at its said opposite end a partial notch $f^5$ half way through the thickness of the segment to receive the side leaf $f^2$ on the inner leaf $f$ of the adjacent or abutting segment of the packing ring, and shoulders for said compression fingers $f^{15}$ and $f^{16}$ to abut against, substantially as specified.

JOHN H. LEWIS.
LOUIS G. KUNZER.

Witnesses:
 PEARL ABRAMS,
 H. M. MUNDAY.

Copies of this patent may be obtained for five cents each, by addressing the "Commissioner of Patents, Washington, D. C."